Figure 1:
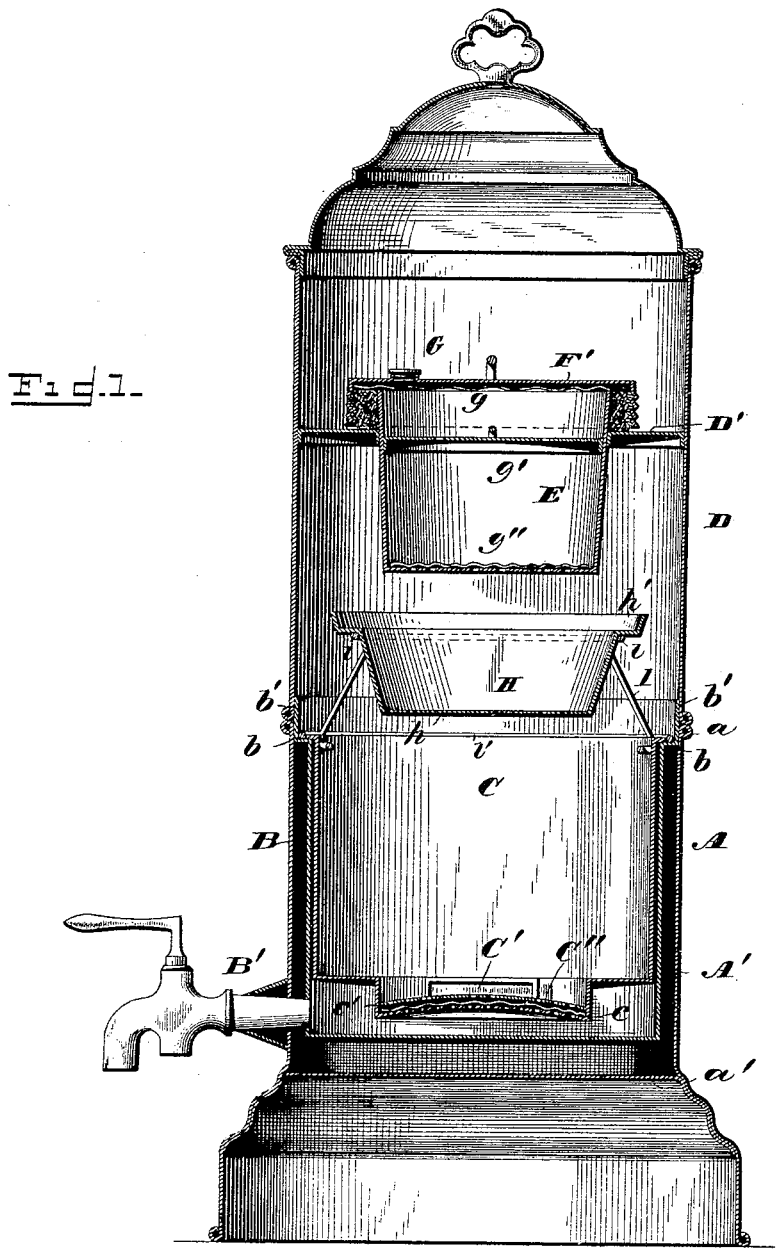

(No Model.) 3 Sheets—Sheet 1.
J. H. DUMONT.
WATER COOLER AND FILTER.

No. 388,347. Patented Aug. 21, 1888.

WITNESSES,

James H. Dumont.
INVENTOR

Attorney.

(No Model.)  3 Sheets—Sheet 2.
J. H. DUMONT.
WATER COOLER AND FILTER.
No. 388,347. Patented Aug. 21, 1888.
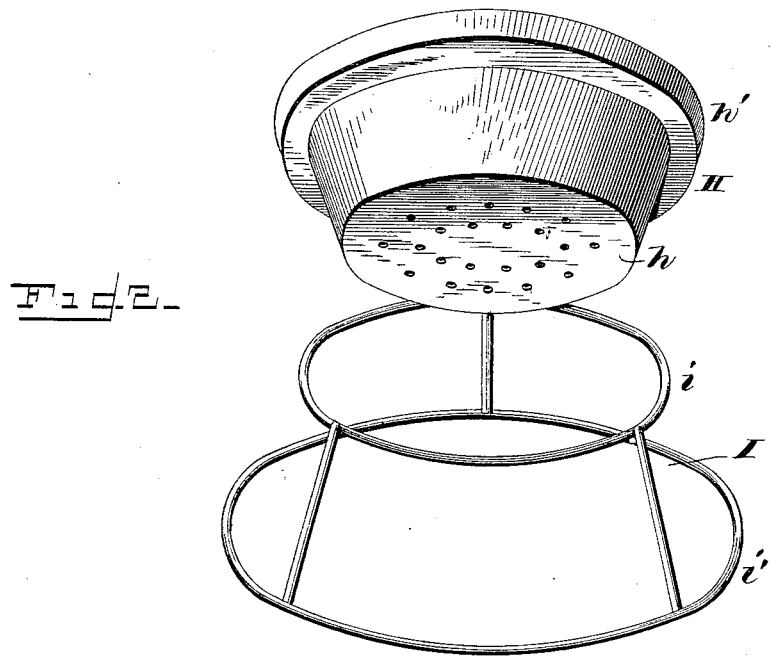
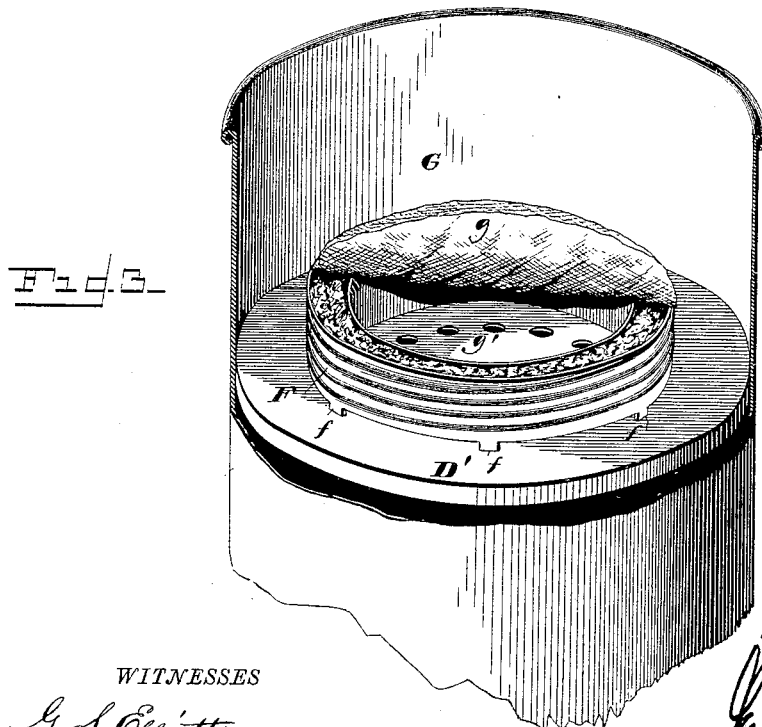
WITNESSES
G. S. Elliott.
C. W. Johnson
James H. Dumont.
INVENTOR
Attorney
N. PETERS, Photo-Lithographer, Washington, D. C.

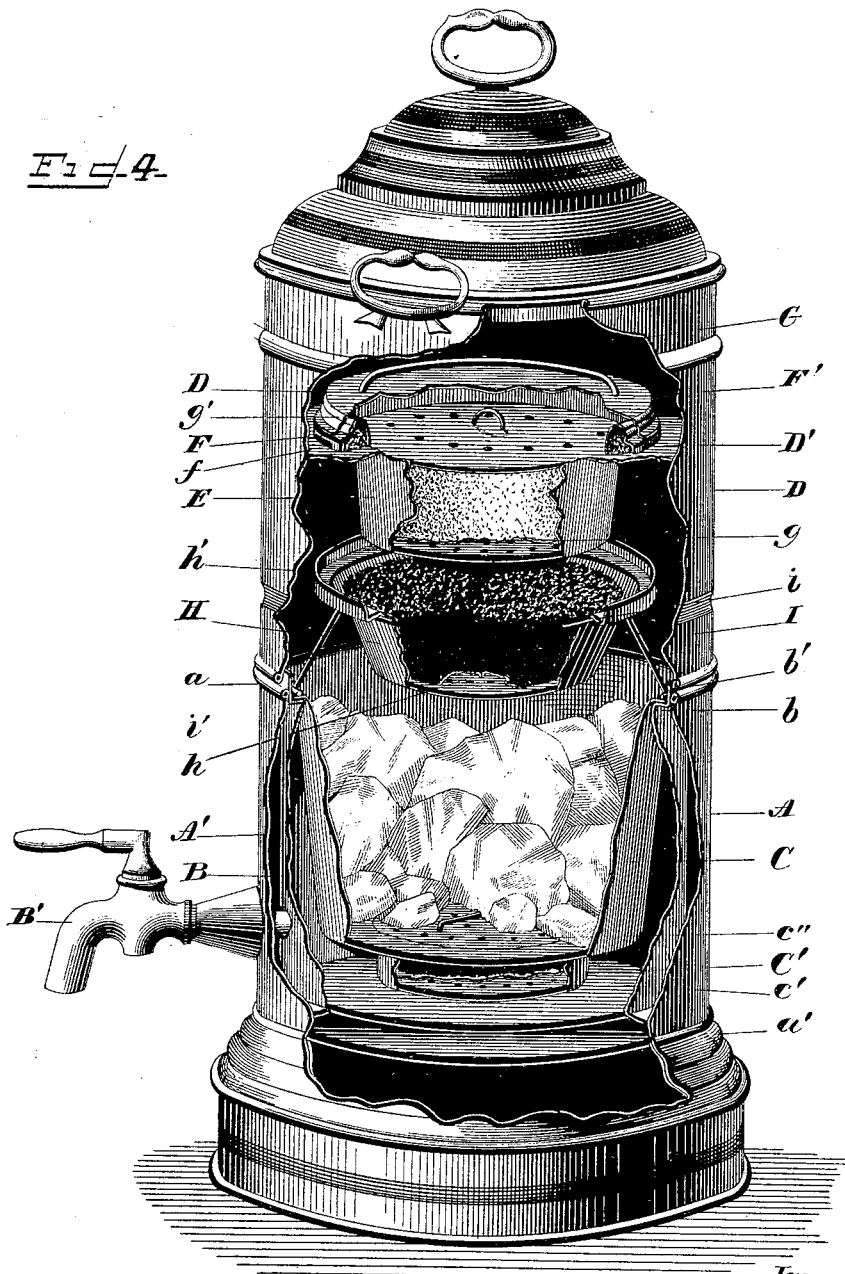

UNITED STATES PATENT OFFICE.

JAMES HERVEY DUMONT, OF NEW YORK, N. Y.

WATER COOLER AND FILTER.

SPECIFICATION forming part of Letters Patent No. 388,347, dated August 21, 1888.

Application filed August 19, 1886. Serial No. 211,269. (No model.)

*To all whom it may concern:*

Be it known that I, JAMES HERVEY DU-MONT, a citizen of the United States of America, residing at New York, in the county of New York and State of New York, have invented certain new and useful Improvements in Water Coolers and Filters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in combined water filters and coolers, the object being to provide a cheap and effective water-cooler which is provided with filtering-vessels, which are supported within the same, so that they can be readily removed therefrom for the purpose of repacking and cleansing the filtering material; and my invention consists in the construction and combination of the parts, as will be hereinafter fully set forth.

My invention also consists in the specific arrangement and organization of the parts, as is shown in the accompanying drawings, in which—

Figure 1 is a vertical sectional view of a combined filter and water-cooler constructed in accordance with my invention. Fig. 2 is a detail perspective view of a pan which is supported above the ice-chamber in the filter and is adapted to receive animal charcoal. Fig. 3 is a detail perspective view partly in section, and Fig. 4 is a perspective view having portions of the parts broken away to better show the interior construction.

A refers to the lower portion of the filter, and consists of an outer wall, A', the upper edge of which is provided with a bead, a, the base having a transverse bottom, a', attached to the vertical walls thereof.

B is a water-chamber, which is suspended within the outer wall, A', so as to provide a dead-air space between the inner and outer walls, and said water-chamber is provided with an outlet-cock, B', which is secured near the base thereof and to the outer wall. The upper portion of the water chamber or vessel is bent outwardly, so as to provide a horizontal rest, b, from which extends an upwardly-projecting flange, b', which is located immediately within the bead a.

C refers to the ice-chamber, which is provided at its lower portion with a downwardly-projecting center portion, C', the bottom c of which may be convex in cross-section and provided with a series of perforations. Immediately above this perforated bottom are placed one or more layers of textile fabric, c', which are held in place by a covering-plate, c'', which is perforated and provided with a handle for convenience in removing the same. The cloth or textile fabric and the perforated plates will intercept such impurities as may be in the ice, and will prevent them entering the supply-chamber. The ice-chamber C is provided at its upper edge with an outwardly-extending flange, which will rest upon the inner edge of the flange b.

D represents the outer vertical wall of the upper portion of the water filter and cooler, and it is provided at about its center portion with a transverse partition, D', which has a central opening, within which is secured a downwardly-projecting vessel, E, which is slightly conical. The upper portion of the vessel E extends above the partition-plate D', as shown in Fig. 1, and it is surrounded by a wall, F, which is preferably screw-threaded for the reception of a cap, F'. The vertical or screw-threaded wall F is secured to the transverse partition-plate D' by means of downwardly-projecting feet $f$, so as to provide a space under which the water will flow from the receiving-chamber G. The intervening space between the vertical screw-threaded wall F and the outer upper edge of the vessel E is filled or packed with sponge or other similar material, and over the same may be placed a disk of textile fabric, $b$. Within the vessel or receptacle E is placed a transverse perforated plate, $b'$, and said vessel between said plate and its perforated bottom is filled with sand, silex, or other filtering material, a disk of textile fabric, $g''$, being placed over the perforated bottom, so as to prevent the sand being washed through the perforations.

Immediately under the vessel E is located a pan, H, the sides of which converge, said pan being provided with a perforated bottom, $h$, and the outwardly and upwardly projecting flange $h'$ at its upper edge, which will rest upon the upper ring, $i$, of the frame I, the lower ring, $i'$, thereof resting upon the flange $b$ of the receptacle B. This pan H is preferably partially filled with a packing of animal charcoal, and through the same the water will pass before coming in contact with the ice in the ice-chamber or entering the supply-receptacle. The upper vessel, B, is provided with a suitable covering or top.

The operation of my invention is as follows: The water is first placed in the upper compartment of the vessel D, and passes through the packing of sponge, which will remove the larger impurities therefrom. The water then collects above a packing of sand contained in the lower portion of the vessel E and drips through the perforated bottom thereof into the vessel H, which contains a packing of bone-black. From thence the water drips upon the ice and flows through the plate $c''$ and perforated bottom $c$ into a supply-chamber which is located beneath the ice-chamber. The filter and water-cooler hereinbefore described is extremely simple in construction and effective in operation, and the parts are so constructed that the packing can be readily removed and cleansed. The ice-chamber, being located in the lower portion of the filter, is so constituted that it is surrounded by the dead-air space of the outer vessel, and the unfiltered water will not come in contact with the ice.

By the arrangement and construction of the parts as hereinbefore described an attachment for filtering the water from the melted ice is provided, as the ice when placed in the lower chamber does not come in direct contact with the water, yet said water has the full benefit of the cooling influence of the ice.

I claim—

1. In a combined water cooler and filter constructed substantially as shown, an ice-receptacle adapted to be suspended within the chamber for the filtered water, said ice-chamber having a filter or strainer, whereby the impurities which may be in the ice are prevented from entering the chamber for the filtered water, substantially as shown, and for the purposes set forth.

2. The combination, in a combined water cooler and filter, of an ice-chamber adapted to be suspended below the filter and within the chamber for the filtered water, said ice-chamber being provided at its upper edge with a projecting flange and with a depending bottom portion with perforations, a covering therefor of textile fabric, and a perforated disk for holding said fabric in place, substantially as shown.

3. In a combined water cooler and filter, a lower vessel provided with interior and exterior walls, so as to provide an air-space between the same, the interior walls constituting a vessel for the filtered water, said vessel having a horizontal portion, $b$, and a vertical portion, $b'$, formed integral therewith, which extends above the upper edge of the lower vessel, in combination with the portion D of the filter, and an ice-receptacle having at its upper edge an outwardly-projecting flange which engages with the portion $b$, so as to support the same within the chamber for the filtered water, substantially as shown.

4. In a combined water cooler and filter, an upper vessel having a partition-plate, so as to form a chamber for the unfiltered water, said partition having an opening within which is secured a filtering-vessel and an upwardly-projecting wall for maintaining an imperforate covering-plate in position, a pan supported under said filtering-vessel by means of a frame, and an ice-receiving receptacle adapted to occupy a position in the lower portion of the filter, the parts being combined and organized substantially as shown.

5. A combined water cooler and filter comprising a receptacle for the unfiltered water, the bottom thereof having a central opening within which is secured a filtering-vessel, the upper edge of said vessel being surrounded by a primary strainer, a chamber for the filtered water, and an ice-receptacle suspended within the chamber for the filtered water, said ice-receptacle having a strainer, the parts being combined substantially as shown.

6. In combination with a water cooler and filter, a chamber, D, provided with a transverse partition having a central opening therein, an upwardly-projecting flange attached at intervals to said partition, so as to provide a passage-way beneath the same, a vessel maintained by said partition so that the upper edge will extend above the partition, and a cap adapted to fit over the flange, and a primary strainer confined between said flanges, substantially as shown, and for the purposes set forth.

7. In a filter, a removable ice-receptacle adapted to be supported within the chamber containing the filtered water, consisting of the side walls provided at their upper edges with an outwardly-projecting flange and at the base thereof with a depending portion having a perforated bottom, a perforated covering-plate provided with a handle, and one or more layers of textile fabric interposed between the bottom and covering-plate, the parts being organized substantially as shown.

8. In a combined water cooler and filter, a base comprising an exterior vessel, upon the upper edge of which is formed a bead, $a$, a vessel for filtered water attached thereto, so as to provide a dead-air space, the upper edge, $b'$, extending above the bead $a$, and a horizontal projecting portion, $b$, below the bead, a vessel provided with a flanged upper edge and a perforated bottom, and an upper vessel adapted to be supported upon the upper edge of the lower vessel, substantially as shown, and for the purpose set forth.

9. In a combined water cooler and filter, the combination of the vessel A, provided with an interior wall, which extends above the upper edge of the outer wall and is provided with a horizontal portion, and an ice-chamber provided at its upper edge with an outwardly-projecting flange, which engages with a horizontal portion of the inner wall, substantially as shown.

10. In a water-filter for domestic use, an upper chamber or receptacle, D, provided near its central interior portion with a transverse partition, a vessel, E, supported by said partition and provided with an upwardly-projecting portion, which extends above said partition-plate, an upwardly-projecting screw-threaded flange with downwardly-projecting feet attached to said partition-plate, and a screw-threaded cap, F', adapted to hold in place a packing placed within the upwardly-projecting flange F, substantially as shown, and for the purpose set forth.

In testimony whereof I affix my signature in presence of two witnesses.

JAMES HERVEY DUMONT.

Witnesses:
J. W. BROWN,
ALBERT L. BLOWERS.